(12) United States Patent
Fujiwara et al.

(10) Patent No.: US 7,340,614 B2
(45) Date of Patent: Mar. 4, 2008

(54) SEMICONDUCTOR DEVICE INCLUDING ENCRYPTION SECTION, SEMICONDUCTOR DEVICE INCLUDING EXTERNAL INTERFACE, AND CONTENT REPRODUCTION METHOD

(75) Inventors: Makoto Fujiwara, Kyoto (JP); Yusuke Nemoto, Hyogo (JP); Junichi Yasui, Osaka (JP); Takuji Maeda, Osaka (JP); Takayuki Ito, Osaka (JP); Yasushi Yamada, Aichi (JP); Shinji Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 848 days.

(21) Appl. No.: 10/654,084

(22) Filed: Sep. 4, 2003

(65) Prior Publication Data

US 2004/0059928 A1 Mar. 25, 2004

(30) Foreign Application Priority Data

Sep. 4, 2002 (JP) ............................. 2002-258481

(51) Int. Cl.
  *G06F 12/14* (2006.01)
(52) U.S. Cl. ..................................................... 713/193
(58) Field of Classification Search .................. 726/31
  See application file for complete search history.

(56) References Cited

U.S. PATENT DOCUMENTS

| 4,465,901 | A | 8/1984 | Best |
| 5,224,166 | A | 6/1993 | Hartman, Jr. |
| 5,666,411 | A | 9/1997 | McCarty |
| 5,892,900 | A | 4/1999 | Ginter et al. |
| 6,618,807 | B1 | 9/2003 | Wang et al. |
| 6,751,321 | B1 * | 6/2004 | Kato et al. ................... 380/201 |
| 6,873,706 | B1 * | 3/2005 | Miyazaki et al. ............. 380/30 |
| 7,103,782 | B1 * | 9/2006 | Tugenberg et al. ......... 713/194 |
| 2003/0005321 | A1 * | 1/2003 | Fujioka ....................... 713/193 |
| 2003/0021421 | A1 * | 1/2003 | Yokota et al. .............. 380/277 |
| 2003/0212897 | A1 * | 11/2003 | Dickerson et al. .......... 713/200 |
| 2004/0177215 | A1 * | 9/2004 | Nagamasa et al. .......... 711/103 |

FOREIGN PATENT DOCUMENTS

| EP | 1 202 150 A2 | 5/2002 |
| EP | 1 441 340 A2 | 7/2004 |
| JP | 09-083390 | 3/1997 |
| JP | 10-154976 | 6/1998 |
| JP | 2000-347847 | 12/2000 |
| JP | 2000-347852 | 12/2000 |
| JP | P2003-101527 A | 4/2003 |
| TW | 420796 | 2/2001 |
| TW | 479191 | 3/2002 |

OTHER PUBLICATIONS

Chinese Office Action Issued in corresponding Chinese Patent Application No. CN 200510097055X, dated Feb. 16, 2007.

* cited by examiner

*Primary Examiner*—Matthew B Smithers
(74) *Attorney, Agent, or Firm*—McDermott Will & Emery LLP

(57) ABSTRACT

A secure LSI device 1 includes an encryption section 2 for encrypting a program, and an external I/F 50 for inputting/outputting a program or data from/to an external memory 100. In the encryption section 2, the operation of a private key arithmetic processing section 20 is prohibited with respect to a sequence whose execution is determined by a key-generation/update sequencer 30 to be impermissible. In the external I/F 50, a program processing section 51 and a data processing section 55 are structured independently from each other.

15 Claims, 11 Drawing Sheets

SEMICONDUCTOR DEVICE INCLUDING ENCRYPTION SECTION, SEMICONDUCTOR DEVICE INCLUDING EXTERNAL INTERFACE, AND CONTENT REPRODUCTION METHOD

BACKGROUND OF THE INVENTION

The present invention relates to a technique for improving security in a semiconductor device, such as an LSI device used in a key-installed system.

Japanese Patent Application No. 2001-286881 filed by the applicant of the present application discloses a technique for improving the secrecy and confidentiality of a key in a key-installed system as compared with conventional techniques.

An objective of the present invention is to provide a high-security semiconductor device. Another objective of the present invention is to provide a high-security content reproduction method.

SUMMARY OF THE INVENTION

In order to achieve the above objective, a semiconductor device of the present invention comprises an encryption section which performs at least one of encryption and decryption of a program, wherein the encryption section includes an encryption arithmetic processing section capable of executing a plurality of sequences including an encryption process or decryption process of a program, and an encryption control section for determining whether to permit execution of each of the sequences which can be executed by the encryption arithmetic processing section, and prohibiting the operation of the encryption arithmetic processing section with respect to a sequence whose execution is determined to be impermissible.

According to the present invention, in the encryption section, the encryption control section prohibits the operation of the encryption arithmetic processing section with respect to a sequence whose execution is determined to be impermissible among the sequences which can be executed by the encryption arithmetic processing section. That is, only a sequence whose execution is determined by the encryption control section to be permissible is executed by the encryption arithmetic processing section. Thus, fraudulent execution of sequences can be prevented, and the security level is improved.

In the semiconductor device of the present invention, the plurality of sequences preferably include an encryption process or decryption process of a key.

In the semiconductor device of the present invention, it is preferable that the encryption control section includes a mode ID storage register for storing a mode ID; and the encryption control section determines whether to permit execution of each of the sequences based on the value of the mode ID stored in the mode ID storage register.

In the semiconductor device of the present invention, it is preferable that the encryption control section includes a plurality of registers which correspond to the sequences on a one-to-one basis, each register storing the number of issuances of a corresponding one of the sequences; and the encryption control section determines whether to permit execution of each sequence while considering the number of issuances of the each sequence which is stored in the corresponding register in addition to the value of the mode ID.

Furthermore, it is preferable that the semiconductor device further comprises a secure memory having an unrewritable area, the unrewritable area storing the mode ID, wherein the mode ID storage register is writable only at the time of boot-up of the semiconductor device; and at the time of boot-up of the semiconductor device, the mode ID read from the unrewritable area of the secure memory is written in the mode ID storage register. Furthermore, it is preferable that the semiconductor device further comprises a boot ROM for storing a boot program, wherein writing of the mode ID in the mode ID storage register is performed by the boot program stored in the boot ROM.

Furthermore, it is preferable that the semiconductor device further comprises a secure memory for storing an installation mode flag, the installation mode flag indicating whether or not the semiconductor device is booted up for the first time, wherein the encryption control section determines whether to permit execution of each sequence while referring to the installation mode flag in addition to the value of the mode ID.

Furthermore, it is preferable that the semiconductor device of the present invention further comprises a boot ROM for storing at least one boot program corresponding to one of the plurality of sequences, wherein the encryption arithmetic processing section executes the boot program stored in the boot ROM, thereby executing the sequence corresponding to the boot program.

Furthermore, it is preferable that the semiconductor device of the present invention further comprises a controller for preventing accesses from the outside of the semiconductor device to the registers of the encryption arithmetic processing section and the encryption control section.

Another semiconductor device of the present invention comprises an external interface for inputting/outputting a program or data from/to an external memory, the external interface includes a program processing section for inputting/outputting a program and a data processing section for inputting/outputting data, wherein the program processing section and the data processing section are structured independently from each other.

According to the present invention, in the external interface, the program processing section and the data processing section are structured independently from each other. Thus, the risk of fraudulently executing a program is distributed, and the security level is improved.

In the semiconductor device of the present invention, the program processing section preferably includes a through section for inputting/outputting a program as it is, and a program-decryption cryptography engine for receiving an encrypted program from the external memory, decrypting the encrypted program into a raw (binary) program, and supplying the raw (binary) program to the inside of the semiconductor device.

Furthermore, it is preferable that the through section includes an execution through section and an encryption through section, a program input through the encryption through section is executed in the semiconductor device, and a program input through the encryption through section is supplied to and encrypted in the encryption section.

Furthermore, it is preferable that the semiconductor device further comprises an address segment storage register for storing address management information which represents the correspondence between respective areas of the external memory and addresses, wherein when the semiconductor device accesses the external memory to read a program, the address management information is referred to for determining which of the encryption through section, the execution through section and the program-decryption cryptography engine is activated.

Furthermore, it is preferable that the address segment storage register is writable only at the time of boot-up of the semiconductor device.

Furthermore, it is preferable that the semiconductor device further comprises a secure memory having an unrewritable area, the unrewritable area storing the address management information, wherein at the time of boot-up of the semiconductor device, the address management information read from the unrewritable area of the secure memory is written in the address segment storage register.

Furthermore, the semiconductor device further comprises a mode sequencer which has a mode ID storage register for storing a mode ID, wherein the value of the mode ID stored in the mode ID storage register is additionally considered for determining which of the encryption through section, the execution through section and the program-decryption cryptography engine is activated.

Furthermore, it is preferable that the mode sequencer includes a jumper value determination section; and a jumper value determined by the jumper value determination section is additionally considered for determining which of the encryption through section, the execution through section and the program-decryption cryptography engine is activated.

Furthermore, in the semiconductor device of the present invention, the data processing section preferably includes a through section for inputting/outputting data as it is, and a data-encryption/decryption cryptography engine for performing encryption or decryption of data at the time of input/output of the data.

In order to achieve the above objective, a content reproduction method of the present invention comprises the steps of: reading an original content stored in an irreproducible area of an external memory into an LSI device; generating a data inherent key in the LSI device using an inherent ID stored in an internal memory; encrypting the original content in the LSI device using the data inherent key; storing the encrypted content in a reproducible area of the external memory; reading the encrypted content stored in the reproducible area into the LSI device; decrypting the encrypted content in the LSI device using the data inherent key; and reproducing the decrypted content in the LSI device.

According to the present invention, an original content stored in the irreproducible area of the external memory is decrypted in the LSI device using the data inherent key which is generated using the inherent ID stored in the internal memory. The encrypted content is stored in the reproducible area of the external memory and decrypted using the data inherent key at the time of reproduction. Since the content encrypted using the data inherent key generated from the inherent ID is stored in the reproducible area of the external memory, the content cannot be reproduced by a different LSI device which does not have the same data inherent key. Therefore, fraudulent execution of the content is prevented, and the security level is improved.

In the content reproduction method of the present invention, it is preferable that the original content stored in the irreproducible area is a content encrypted with a data common key; prior to the step of encrypting the original content using the data inherent key, the original content is decrypted using the data common key stored in the internal memory.

DESCRIPTION OF THE PREFERRED EMBODIMENTS

Hereinafter, an embodiment of the present invention is described with reference to the drawings.

Figure 1:
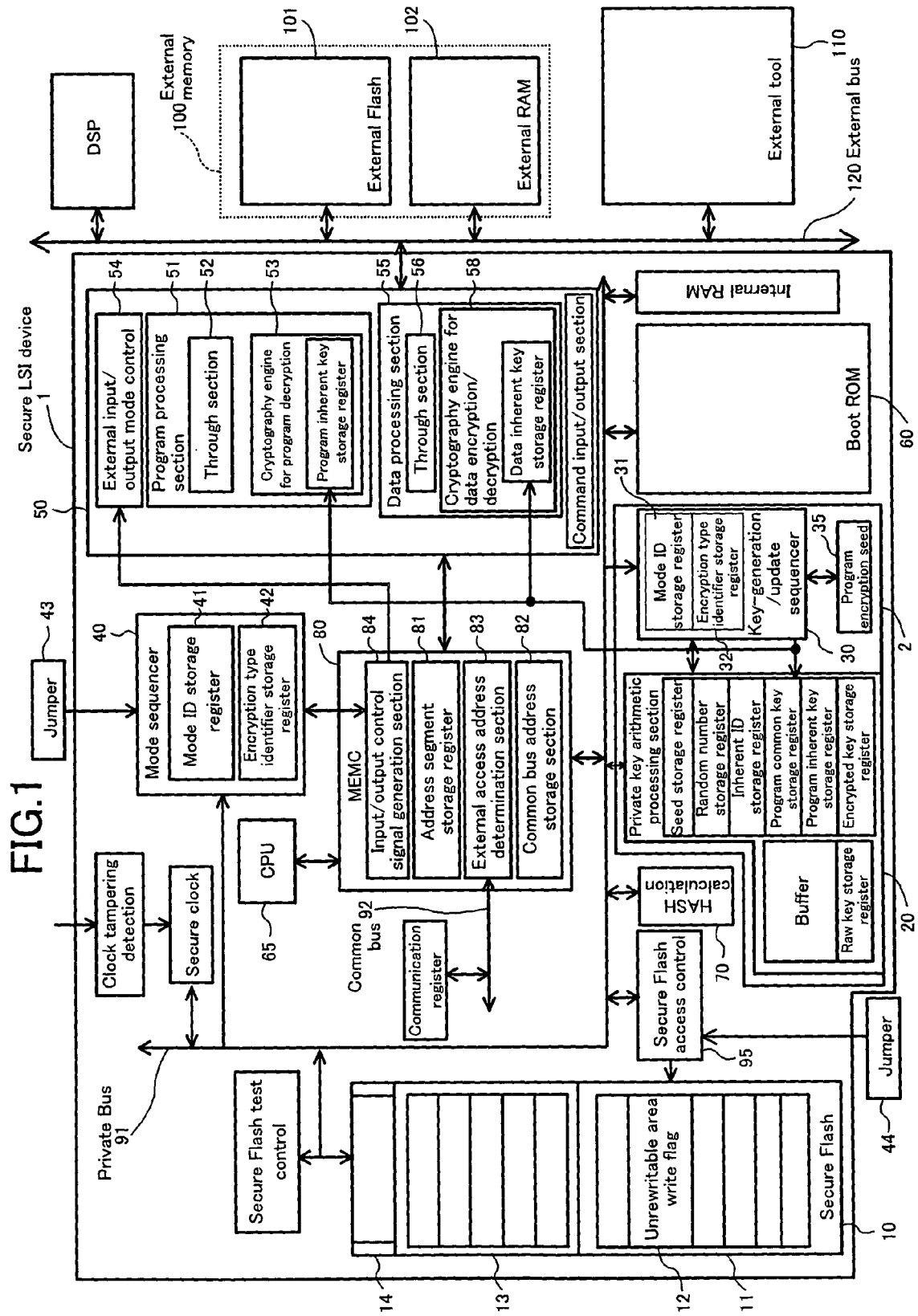
FIG. 1 is a block diagram showing the structure of a secure LSI device which is a semiconductor device according to an embodiment of the present invention.

FIG. 1 is a block diagram showing an internal structure of a secure LSI device according to the present embodiment. In FIG. 1, the secure LSI device 1 can be connected to an external memory 100 (including a flash memory 101 and a RAM 102) through an external bus 120. The operation mode of the secure LSI device 1 can be set by supplying a mode ID to the secure LSI device 1.

Major components of the secure LSI device 1, which are relevant to the present embodiment, are briefly described.

The secure LSI device 1 has a secure memory (e.g., secure Flash) 10 including an unrewritable area 11. The unrewritable area 11 includes an unrewritable area write flag 12. Once a mode ID is written in the secure memory 10, the flag value of the unrewritable area write flag 12 is changed from "WRITABLE" to "WRITTEN", and writing in the unrewritable area 11 is thereafter prohibited. It should be noted that the secure memory 10 is composed of a flash memory in the present embodiment, but the present invention is not limited thereto. Any type of memory may be used so long as it is nonvolatile.

An encryption section 2 performs encryption and decryption of programs. The encryption section 2 includes a private key arithmetic processing section (encryption arithmetic processing section) 20, a key-generation/update sequencer (encryption control section) 30 and a storage section 35 for storing a program encryption seed. The private key arithmetic processing section 20 includes registers for storing various keys, or the like, and is capable of executing a plurality of sequences including a process for encrypting or decrypting programs. The key-generation/update sequencer 30 determines whether to permit execution of each of the sequences which can be executed by the private key arithmetic processing section 20, and prohibits the operation of the private key arithmetic processing section 20 with respect to a sequence whose execution is determined to be impermissible. The key-generation/update sequencer 30 includes a mode ID storage register 31. The key-generation/update sequencer 30 determines whether to permit execution of each sequence based on the value of the mode ID stored in the mode ID storage register 31. Furthermore, the key-generation/update sequencer 30 includes an encryption type identifier storage register 32 for storing an encryption type identifier. The encryption type identifier indicates what algorithm and key length are used for encrypting a key or program. Details of the structure and operation of the encryption section 2 will be described later.

A mode sequencer 40 also includes a mode ID storage register 41. The mode sequencer 40 controls the operation of an external host interface (I/F) 50, i.e., which interface is used for reading a program or data stored in the external memory 100, according to a mode ID stored in the mode ID storage register 41 and the value of a jumper 43. With this arrangement, it is possible to control whether or not a raw (binary) program stored in the external memory 100 can be executed. The mode sequencer 40 further includes an encryption type identifier storage register 42 for storing an encryption type identifier. The encryption type identifier indicates what method is used for encrypting a key.

The external I/F 50 transmits/receives a program or data to/from the external memory 100 through one of a through section 52 and a cryptography engine 53 for program decryption (hereinafter, referred to as "program-decryption cryptography engine 53"), which are included in a program processing section 51, and a through section 56 and a cryptography engine 58 for data encryption/decryption (hereinafter, referred to as "data-encryption/decryption cryptography engine 58"), which are included in a data processing section 55, according to the control by the mode sequencer 40.

A program input through the through section 52 is not executed inside the secure LSI device 1 except when the secure LSI device 1 is in an administrator mode or engaged in application program development (described later). That is, the through section 52 is activated when a raw (binary) program is encrypted or when an already-encrypted program is re-encrypted using another key. The secure LSI device 1 is structured such that the operation of the secure LSI device 1 does not proceed to a program which is input through the through section 52 except when the secure LSI device 1 is in the administrator mode or engaged in application program development (described later). Therefore, for example, even when the secure LSI device 1 completed as a commercial product reads a raw (binary) program through the through section 52, the secure LSI device 1 cannot execute the raw (binary) program.

A boot ROM 60 stores a boot program for controlling the boot-up operation of the secure LSI device 1. A HASH calculation section 70 calculates a HASH value for verifying the validity of a program read into the secure LSI device 1.

Further, in the external memory 100, programs are stored in the flash memory 101, and data (contents) are stored in the RAM 102. The external tool 110 stores various initial values which are to be transferred to and stored in the secure memory 10 at the time of the first boot-up of the secure LSI device 1. The type of the initial value varies depending on a selected operation mode.

Figure 2:
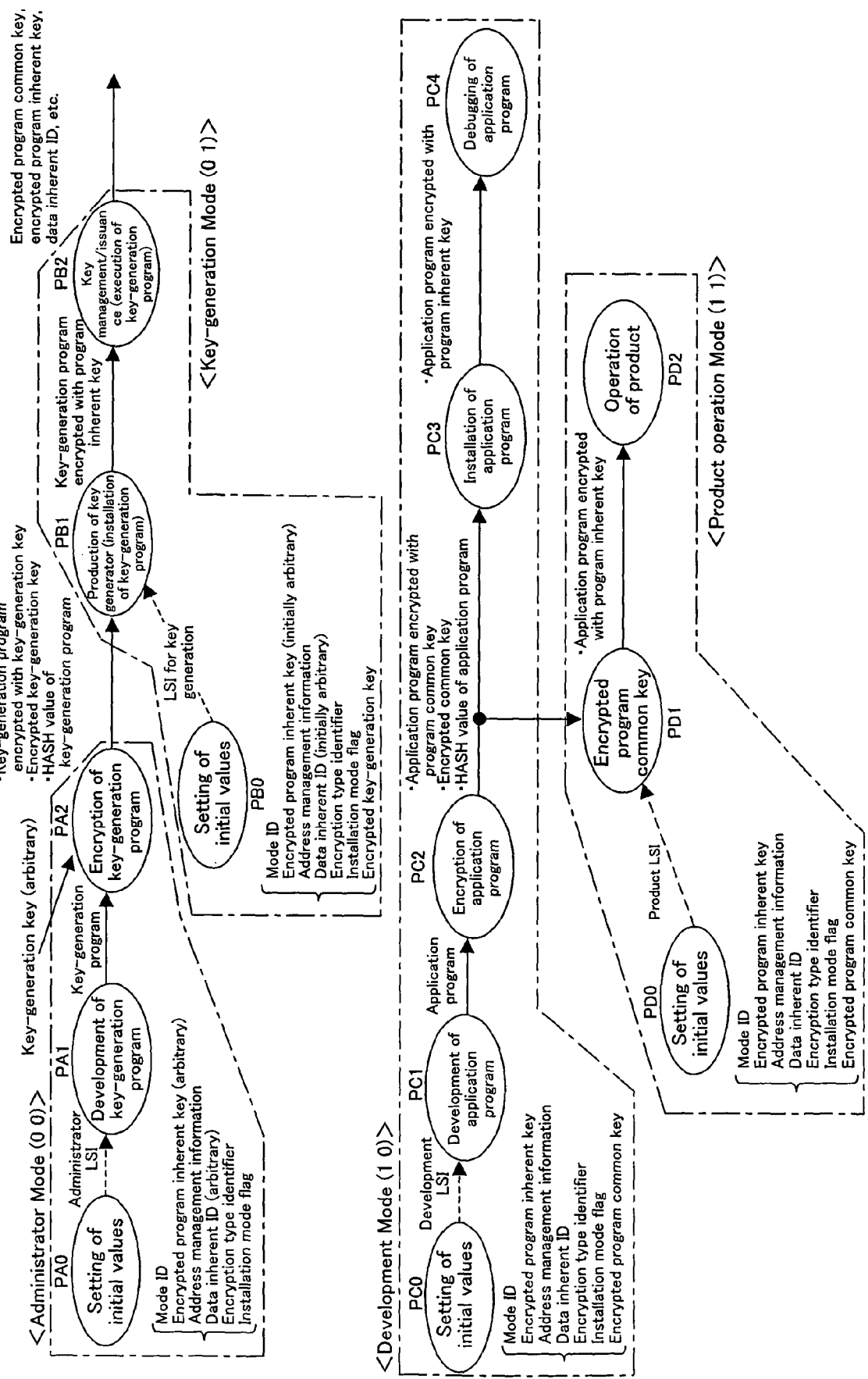
FIG. 2 illustrates an entire flow of development and manufacture which use the secure LSI device of FIG. 1.

FIG. 2 shows the entire flow of development and manufacture which use the secure LSI device 1 of FIG. 1. As shown in FIG. 2, the secure LSI device 1 operates in the following four operation modes: administrator mode (mode ID: 00), key-generation mode (mode ID: 01), development mode (mode ID: 10), and product operation mode (modeID: 11).

When being set to the administrator mode, the secure LSI device 1 operates as an LSI device for an administrator (hereinafter, referred to as "administrator LSI device"). In the administrator LSI device, a key-generation program is developed (PA1), and the developed key-generation program is encrypted using any key-generation key (PA2).

When being set to the key-generation mode, the secure LSI device 1 operates as an LSI device for key generation (hereinafter, referred to as "key-generation LSI device"). In the key-generation LSI device, the encrypted key-generation program generated in the administrator LSI device is installed (PB1), and the key-generation program is executed to generate various keys (PB2).

When being set to the development mode, the secure LSI device 1 operates as an LSI device for development (hereinafter, referred to as "development LSI device"). In the development LSI device, an application program which is to be dexecuted in an actual product is developed (PC1). The application program is encrypted using the program common key (PC2).

When being set to the product operation mode, the secure LSI device 1 operates as an actual product LSI device. The application program generated in the development LSI device and encrypted with the program common key is installed in the product LSI device. Inside the product LSI device, the installed application program is converted to an application program encrypted with a program inherent key (PD1). The application program encrypted with the program inherent key is executed in a normal operation of the product. This conversion processing can be executed also in the development LSI device (PC3) for the purpose of debugging the application program (PC4).

The secure LSI device 1 operates as described below by executing the boot program stored in the boot ROM 60.

Figure 3:
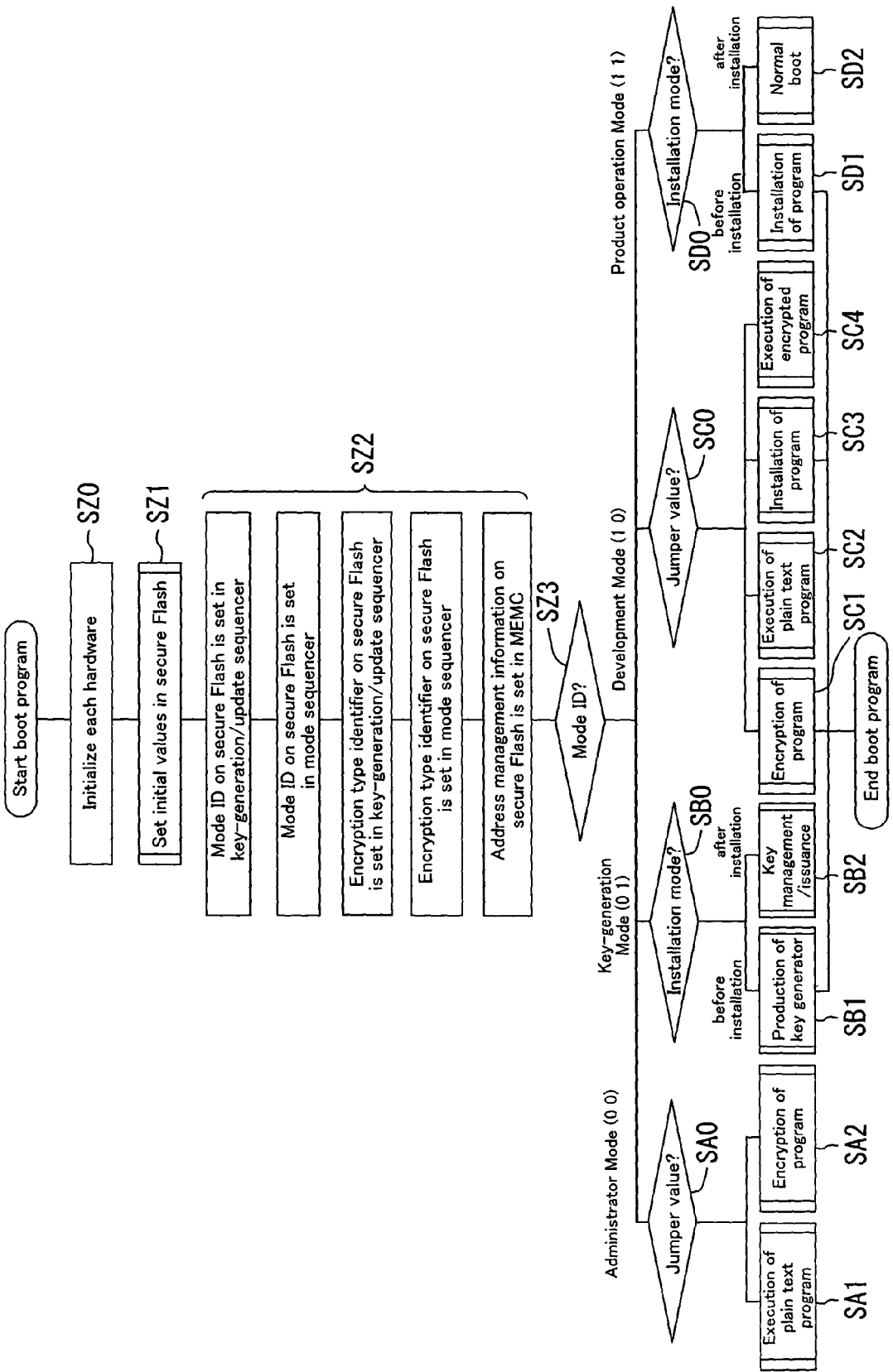
FIG. 3 is a flowchart of an entire process flow of a boot program.

FIG. 3 is a flowchart illustrating the entire process of the boot program. When the secure LSI device 1 is powered on, the boot program stored in the boot ROM 60 is executed by a CPU 65. Referring to FIG. 3, each hardware is first initialized (SZ0). Then, various initial values are read from the external tool 110 and set in the secure memory 10 (SZ1).

Figure 4:
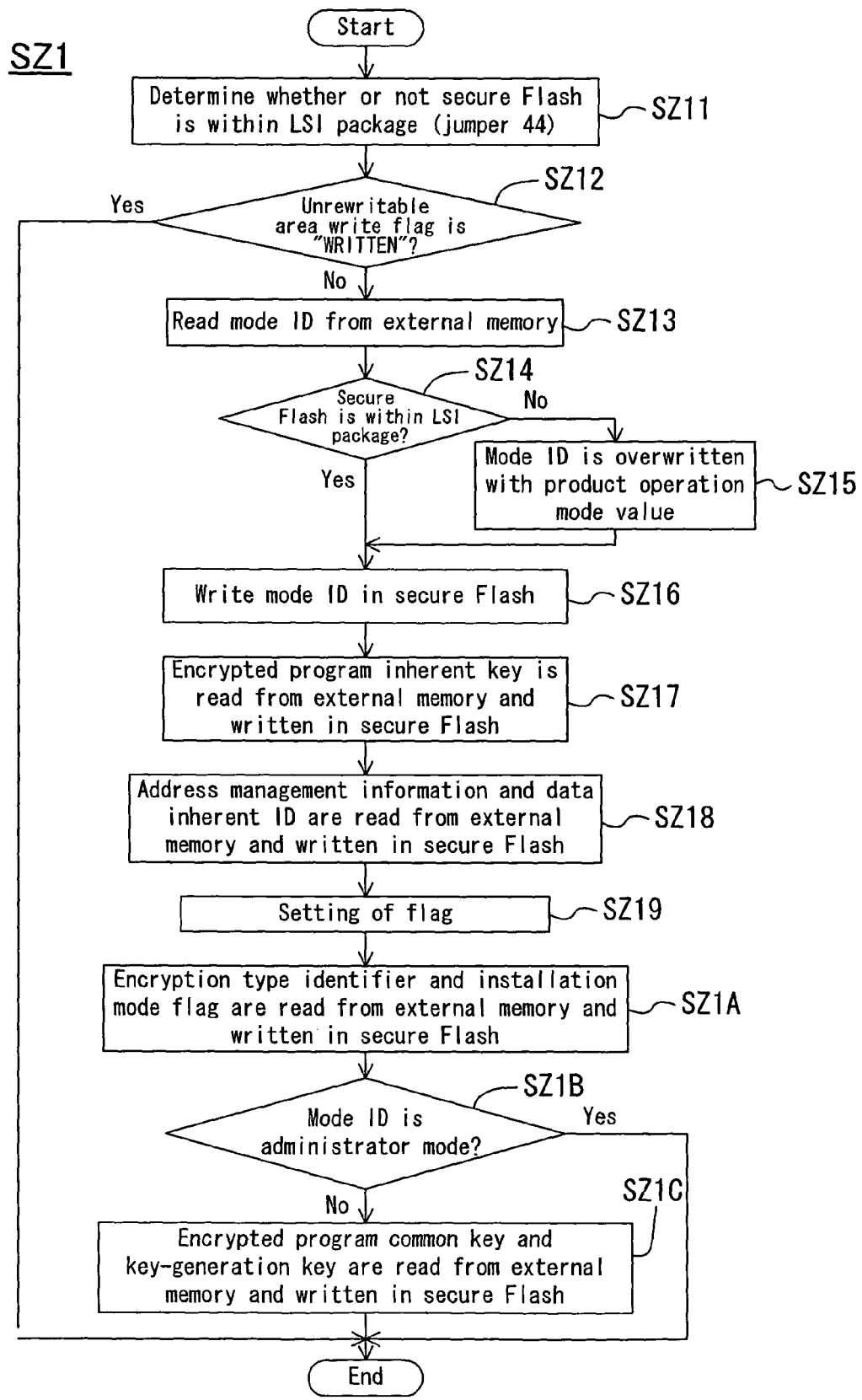
FIG. 4 is a flowchart of initial value setting processing SZ1.

FIG. 4 is a flowchart which illustrates the initial value setting processing SZ1. In the first place, at a jumper 44, it is determined whether or not the secure memory 10 is mounted in the LSI device (SZ11). Next, it is determined whether or not the unrewritable area write flag 12 indicates "WRITTEN" (SZ12). When it indicates "WRITTEN" (Yes at SZ12), the processing SZ1 is ended because an initial value is already set in the secure memory 10. When the unrewritable area write flag 12 indicates "WRITABLE" (No at SZ12), initial values are written in the secure memory 10. In addition to the mode ID, an encrypted program inherent key, address management information and data inherent key are written in the unrewritable area 11 of the secure memory 10 (SZ13, SZ16 to SZ18). If the first determination indicates that the secure memory 10 exists outside the LSI device (No at SZ14), the mode ID is overwritten with a value that indicates the product operation mode (SZ15). As a result, a product which has a secure memory 10 outside its LSI package operates only when it is in the product operation mode.

Next, the unrewritable area write flag 12 is set to "WRITTEN" (SZ19), whereby rewriting in the unrewritable area 11 is thereafter prohibited. Further, an encryption type identifier and an installation mode flag are written in general areas 13 and 14 (SZ1A). When the mode ID indicates a mode other than the administrator mode (No at SZ1B), an encrypted common key and an encrypted key-generation key are written in the general areas 13 and 14 in addition to the encryption type identifier and installation mode flag (SZ1C).

Thereafter, referring back to FIG. 3, preprocessing SZ2 is executed. Herein, the mode ID set in the unrewritable area 11 of the secure memory 10 is set in the mode ID storage register 31 of the key-generation/update sequencer 30 and in the mode ID storage register 41 of the mode sequencer 40. Further, the encryption type identifier set in the general area 13 of the secure memory 10 is set in the encryption type identifier storage register 32 of the key-generation/update sequencer 30 and in the encryption type identifier storage register 42 of the mode sequencer 40. Furthermore, the address management information stored in the unrewritable area 11 of the secure memory 10 is set in an address segment storage register 81 of an MEMC 80. The processes described hereinabove correspond to initial value setting phases PA0, PB0, PC0 and PD0 of FIG. 2.

Thereafter, the operation is performed in a mode determined according to the value of the mode ID (SZ3).

When the mode ID is "00", the secure LSI device 1 is set to the administrator mode to execute raw (binary) program execution processing SA1 or program encryption processing SA2 depending on the value of the jumper 43 (determined at SA0). In key-generation program development phase PA1, raw (binary) program execution processing SA1 is executed to generate a key-generation program. The key-generation program is stored in the external memory 100. In key-generation program encryption phase PA2, the key-generation program is encrypted with any key-generation key.

When the mode ID is "01", the secure LSI device 1 is set to the key-generation mode to execute key generator production processing SB1 or key management/issuance processing SB2 depending on the value of the installation mode flag (determined at SB0). In key generator production phase PB1, key generator production processing SB1 is executed, and the key-generation program encrypted with any key-generation key is re-encrypted with a program inherent key. In key management/issuance phase PB2, the key-generation program encrypted with the program inherent key is executed, whereby the key management/issuance processing SB2 is executed to generate a key.

When the mode ID is "10", the secure LSI device 1 is set to the development mode to execute program encryption processing SC1, raw (binary) program execution processing SC2, program installation processing SC3, or encrypted program execution processing SC4 depending on the value of the jumper 43 (determined at SC0). In application program development phase PC1, raw (binary) program execution processing SC2 is executed to develop an application program. The developed application program is stored in the external memory 100. In application program encryption phase PC2, program encryption processing SC1 is executed. In application program installation phase PC3, program installation processing SC3 is executed. In application program debug phase PC4, encrypted program execution processing SC4 is executed. The program installation processing SC3 and encrypted program execution processing SC4 are the same as processing SD1 and SD2 in the product operation mode, respectively.

When the mode ID is "11", the secure LSI device 1 is set to the product operation mode to execute program installation processing SD1 or normal boot processing SD2 depending on the value of the installation mode flag (determined at SD0). In product installation phase PD1, program installation processing SD1 is executed. In product operation phase PD2, normal boot processing SD2 is executed.

Figure 5:
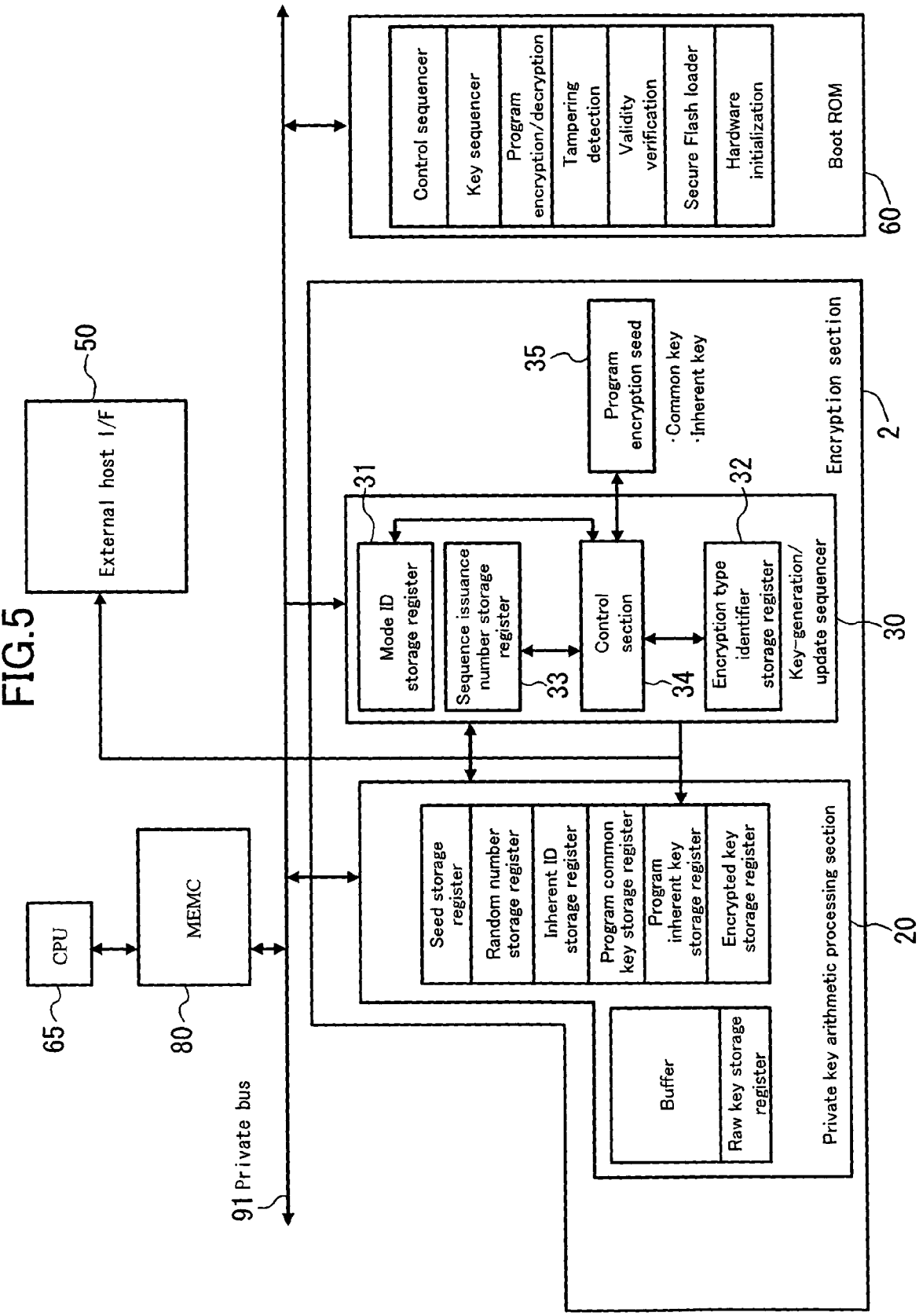
FIG. 5 shows an encryption section and components relevant thereto in the secure LSI device of FIG. 1.

FIG. 5 shows the encryption section 2 and components relevant thereto. As shown in FIG. 5, the key-generation/update sequencer 30 includes registers 33 and a control section 34 in addition to the mode ID storage register 31 and the encryption type identifier storage register 32. The registers 33 are provided so as to correspond to the respective sequences which are executed by the private key arithmetic processing section 20 on a one-to-one basis. Each of the registers 33 stores the number of issuances of a corresponding one of the sequences. The control section 34 refers to the registers 31 and 33 to determine whether to permit execution of each sequence (whether to permit execution of each program in the boot ROM 60 and an external program), and controls the operation of the private key arithmetic processing section 20. In the secure LSI device 1, when each sequence is issued once, 1 (one) is added to a corresponding one of the registers 33.

A program encryption seed 35 is used for decrypting or generating a key. The program encryption seed 35 includes a program encryption seed for a common key and a program encryption seed for an inherent key.

In the product operation mode and the development mode, the control section 34 restricts the operation of the encryption section 2 such that the sequence of setting values stored in the secure memory 10 in the respective registers of the encryption section 2 (secure Flash loader) and the sequence of generating/decrypting a key (key sequencer) each can be issued only once. For example, once the mode ID memorized in the secure memory is stored in the mode ID storage register 31 by a boot program at the time of boot-up of the secure LSI device 1, the stored mode ID cannot be changed again. Moreover, if a common key and an inherent key are decrypted at the time of boot-up of the secure LSI device 1, and the decrypted keys are stored in the registers inside the private key arithmetic processing section 20, any key will never be generated/decrypted again. Thus, even if a key-generation program is installed in the external memory 100, it is impossible to generate a key. A once-decrypted inherent key is stored in an inherent key storage register of the external I/F 50. The encrypted program is executed using this inherent key. Updating of programs is performed using a common key or inherent key stored in registers inside the private key arithmetic processing section 20.

In the key-generation mode and the administrator mode, the restriction on the key sequencer is removed such that a key can be generated.

Herein, a program encryption seed use number storage register may be provided for each program encryption seed, in place of the sequence issuance number storage registers 33. The program encryption seed use number storage register stores the number of times the encryption seed has been used. Since the program encryption key is used for generating/decrypting a key, generation/decryption of keys is restricted by limiting the number of uses of the program encryption seed by the mode ID and counting the number of uses of the program encryption seed.

The program encryption seed does not need to include both the program encryption seed for a common key and the program encryption seed for an inherent key.

Figure 6:
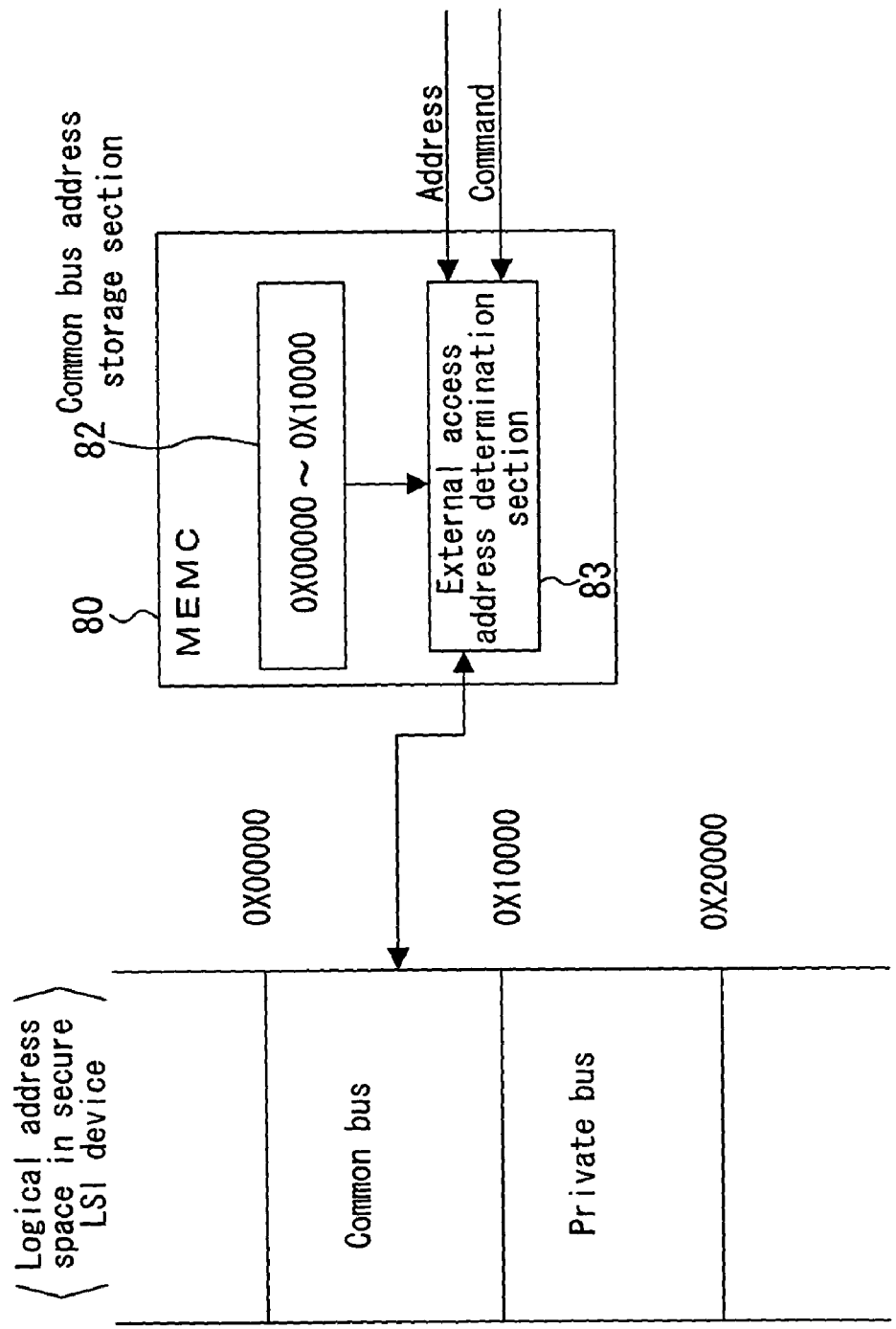
FIG. 6 illustrates a method for setting a common bus and a private bus in the secure LSI device of FIG. 1.

FIG. 6 illustrates a method for setting a common bus and a private bus. Herein, the "private bus" means a bus which is externally inaccessible, but is not necessarily physically independent from the external I/F 50. That is, in a register which is set so as to be connected to a private bus 91, reading and writing based on an external access are inhibited.

Addresses are allocated to the registers and the other elements which are provided inside the secure LSI device 1. Among these addresses, the addresses of registers and the other elements which are connected to a common bus 92 ("0X00000" to "0X10000" in FIG. 6) are stored in the common bus address storage section 82. When an external access is received, an external access address determination section 83 refers to the common bus address storage section 82 to determine whether or not the external access is directed to the common bus 92. If so, the external access address determination section 83 accepts the external access. On the other hand, when the external access is not an access to the common bus 92, it means that the external access is an access to the private bus 91, and therefore, the external access is denied.

When an access from the CPU 65 (internal access) is received, such determination procedure is not performed, and the internal access is accepted.

Figure 7:
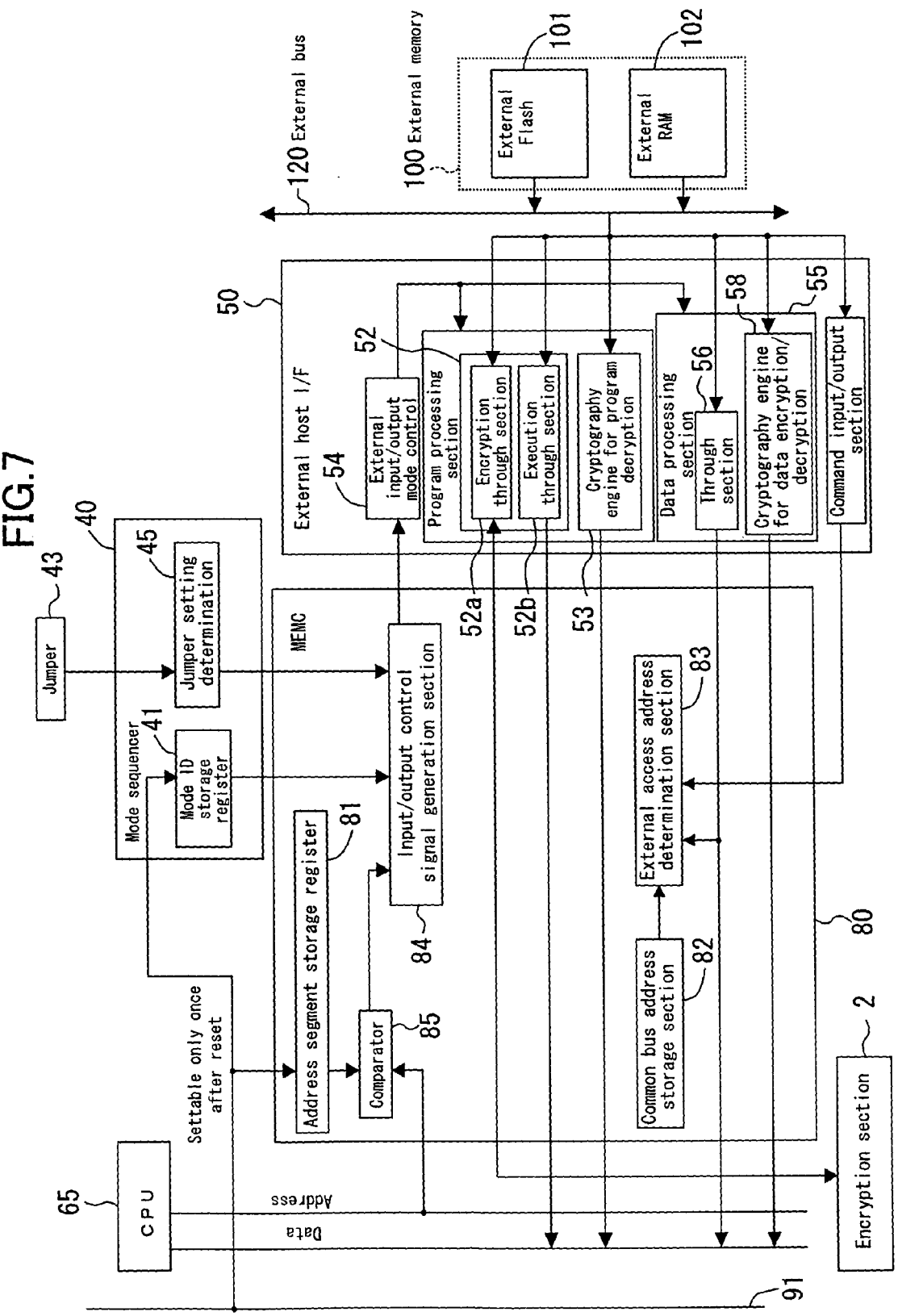
FIG. 7 shows an external host I/F and components relevant thereto in the secure LSI device of FIG. 1.

FIG. 7 shows the external I/F 50 and components relevant thereto. In FIG. 7, an address segment storage register 81 stores address management information which represents the correspondence between the respective areas of the external memory 100 and the addresses. Herein, the external memory 100 is divided into the first area (programs within a predetermined region), the second area (programs out of the predetermined region), the third area (data within the predetermined region) and the fourth area (data out of the predetermined region), and the address segment storage register 81 stores the addresses separately for these four areas.

A comparator 85 refers to the address management information stored in the address segment storage register 81, and determines which of the first to fourth areas the address of information to be input/output falls within. The comparator 85 sends the determination result to an input/output control signal generation section 84.

The input/output control signal generation section 84 determines which interface of the external I/F 50 is activated based on the mode ID and the jumper determination result, which are output from the mode sequencer 40, and the output of the comparator 85. The input/output control signal generation section 84 sends the determination result as an input/output control signal to an input/output mode control section 54. The input/output mode control section 54 activates any of the interfaces according to the received input/output control signal. It should be noted that when the mode ID indicates the product operation mode, a through section 52b for execution (hereinafter, referred to as "execution through section 52b") is always kept inactive, whereby the operation of the secure LSI device 1 is restricted such that a raw (binary) program stored in the external memory 100 is not executed.

In the administrator mode or in the debugging process of the development mode, programs stored in the first area of the external memory 100 are read into the secure LSI device 1 through the execution through section 52b of the program processing section 51. In the key-generation mode, the product operation mode, or the development mode except for the debugging process, the programs stored in the first area is read through the program-decryption cryptography engine 53. These programs can be executed in the secure LSI device 1. On the other hand, programs stored in the second area of the external memory 100 are read into the secure LSI device 1 through a through section 52a for encryption (hereinafter, referred to as "encryption through section 52a") of the program processing section 51. These programs are supplied to the encryption section 2 and encrypted or re-encrypted. These programs cannot be executed in the secure LSI device 1.

Furthermore, data stored in the third area of the external memory 100 are read into the secure LSI device 1 through the data-encryption/decryption cryptography engine 58 of the data processing section 55. Data stored in the fourth area of the external memory 100 are read into the secure LSI device 1 through the through section 56 of the data processing section 55.

The program read through the encryption through section 52a is encrypted or re-encrypted in the private key arithmetic processing section 20 of the encryption section 2. Then, the encrypted or re-encrypted program is transmitted through the encryption through section 52a and written in the first area of the external memory 100. Thereafter, the program can be executed in the secure LSI device 1.

Data are set in the address segment storage register 81 and the mode ID storage register 41 through the private bus 91. That is, data setting is performed by an internal access. Moreover, this data setting process can be executed only once after the secure LSI device 1 is reset.

Figure 8:
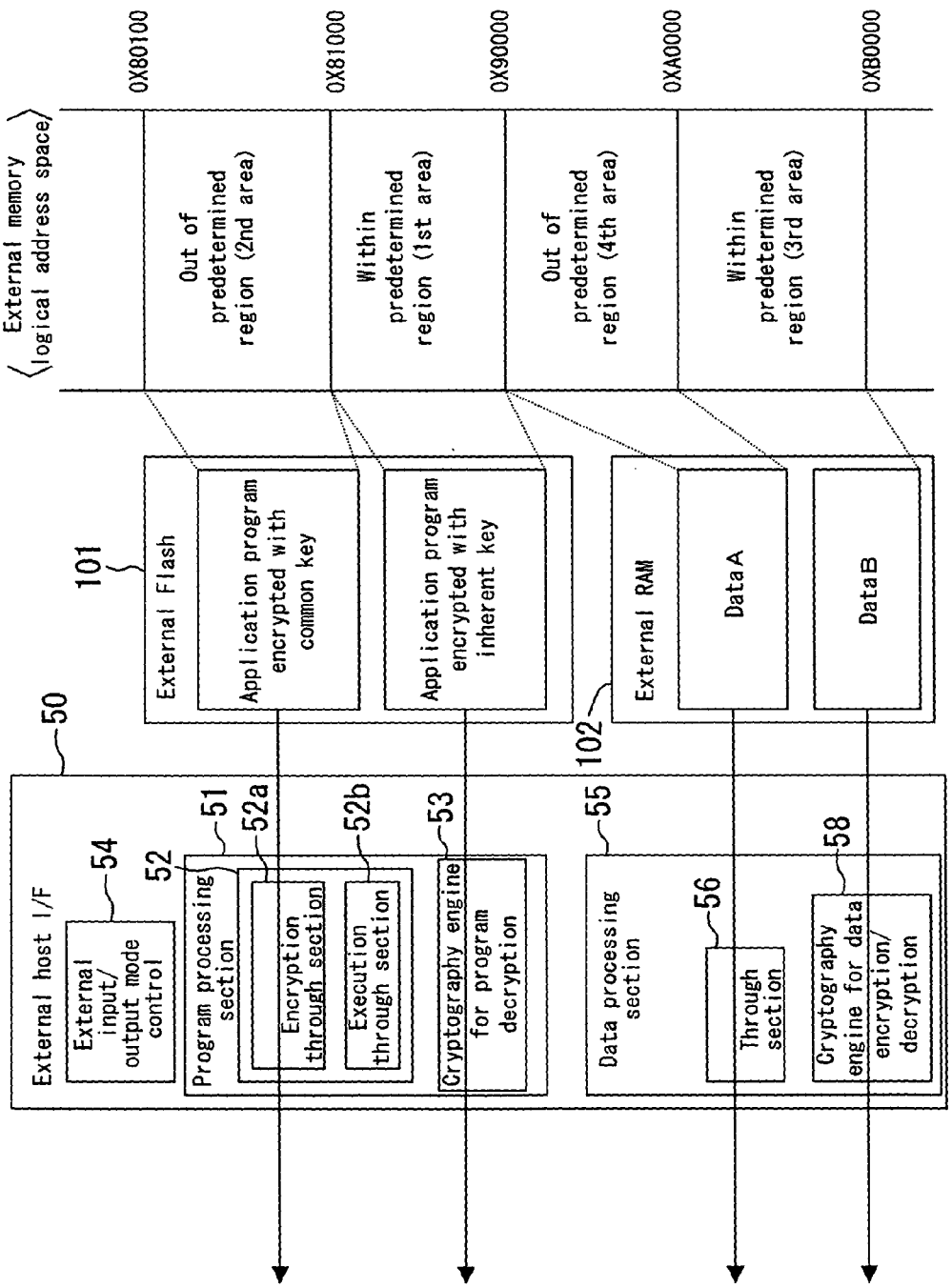
FIG. 8 illustrates an operation of the external host I/F in the product operation mode.

FIG. 8 illustrates an operation of the external I/F 50 which is performed when the secure LSI device 1 is in the production operation mode. As shown in FIG. 8, an application program encrypted with a common key is stored in the second area (out of the predetermined region) of the external memory 100 before it is installed in the secure LSI device 1. Thus, the application program cannot be executed as it is. That is, an application program which is encrypted with a common key and stored in the second area is read through the encryption through section 52a when it is installed in the secure LSI device 1. The application program is decrypted with a common key and then re-encrypted with an inherent key. The re-encrypted application program is transmitted through the encryption through section 52a again and stored in the first area (within the predetermined region) of the external memory 100. The application program encrypted with the inherent key and stored in the first area is read into the secure LSI device 1 through the program-decryption cryptography engine 53 and executed in the secure LSI device 1.

In the development mode, the following operation is performed. When performing the debugging process, a program to be executed is written in the first area (within the predetermined region). With such a preparation, the program is read into the secure LSI device 1 through the execution through section 52b and executed therein even if it is a raw (binary) program. When performing the encryption process, a program to be encrypted is written in the second area (out of the predetermined region). With such a preparation, an encryption sequence is executed at the time when the secure LSI device 1 is booted up, and the program is encrypted with a common key and stored in the external memory 100. When installing a debugged program, a program to be re-encrypted is written in the second area (out of the predetermined region). Furthermore, when debugging an encrypted program, the encrypted program to be debugged is written in the first area (within the predetermined region). With such a preparation, the program is decrypted and executed.

Figure 9:
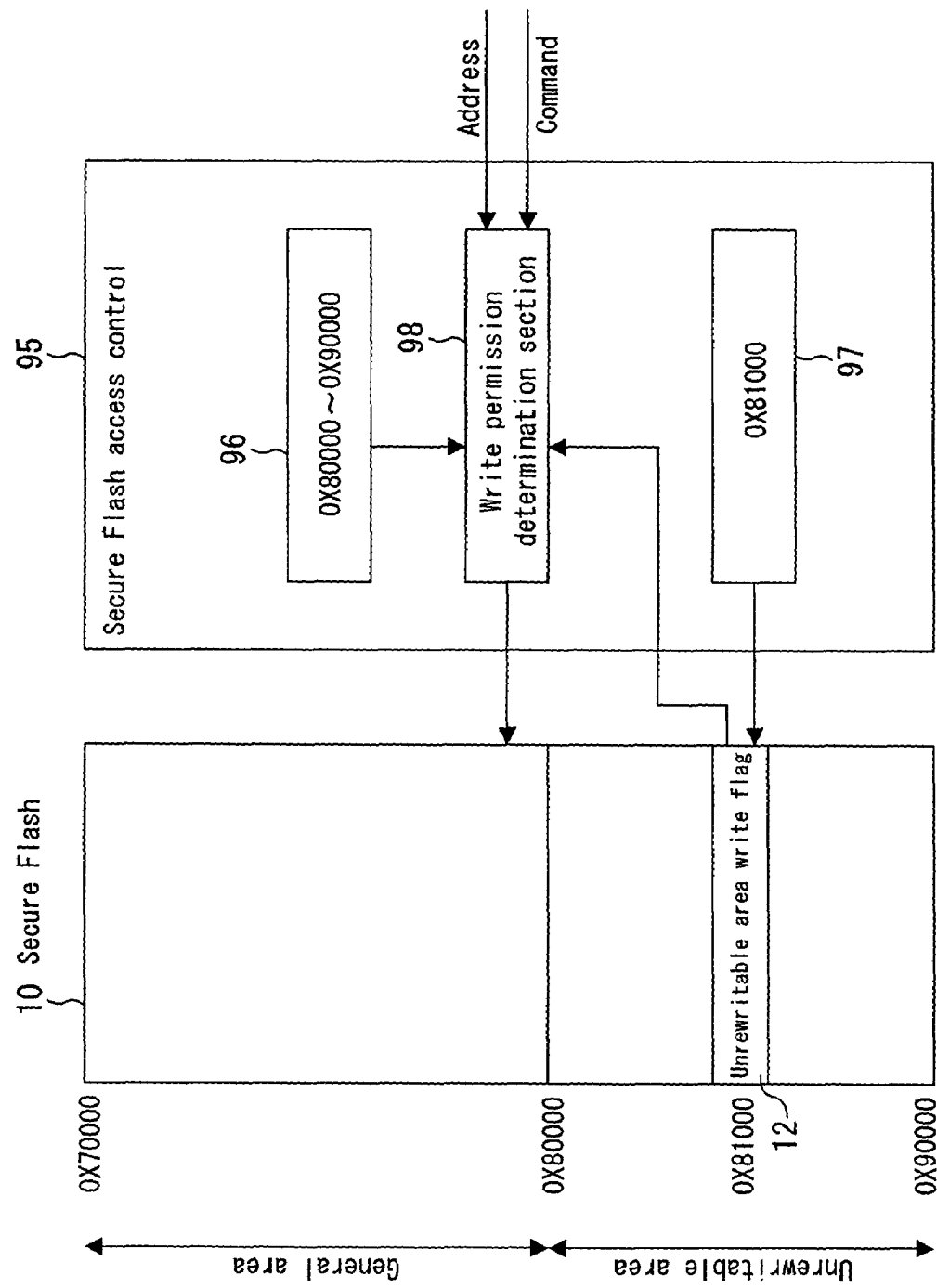
FIG. 9 illustrates access control of a secure memory.

FIG. 9 illustrates access control of the secure memory 10. As shown in FIG. 9, an access control section 95 includes a register 96 for storing addresses of the unwritable area 11, a register 97 for storing an address of the unrewritable area write flag 12, and a write permission determination section 98. The registers 96 and 97 are designed such that, once data are written in the registers 96 and 97, another writing process is prohibited by means of flag management, or the like.

The access control is performed as follows. An access from the CPU 65 to the secure memory 10 is always performed through the access control section 95. When a given command is the "read" command, data in the secure memory 10 is output to the private bus 91 regardless of whether an address to be accessed is within the unrewritable area or the general area. On the other hand, when a given command is the "write" command, the write permission determination section 98 refers to an address to be accessed, an address stored in the register 96, and the value of the unrewritable area write flag 12, to determine whether writing is performed or not. Specifically, the determination is made as follows:

(Flag "WRITTEN" and Unwritable area) . . . Writing is not permitted
(Flag "WRITTEN" and General area) . . . Writing is permitted
(Flag "WRITABLE" and Unwritable area) . . . Writing is permitted
(Flag "WRITABLE" and General area) . . . Writing is permitted The secure memory 10 includes the commands of "sector delete", "chip delete", etc. When the unrewritable area write flag 12 is "WRITTEN", the "sector delete" command is accepted for the general area but is not accepted for the unrewritable area. The "chip delete" command is not accepted.

Even in the reproduction of contents (data), the security is improved by employing the following method.

Data are first stored in the fourth area (out of the predetermined region) of the external RAM 102. While being in the fourth area, the data are data encrypted with a data common key (different from the program common key) or raw (binary) data. Thus, there is a possibility that the data are fraudulently used by another LSI device, i.e., there is a vulnerability in the security.

In order to remove such a vulnerability, especially as for the contents, such as pictures, music, or the like, which should be protected from a fraudulent use, a program for reproducing the contents is designed such that only contents stored in the third area (within the predetermined region) of the external RAM 102 can be reproduced. The data stored in the third area are decrypted by the data-encryption/decryption cryptography engine 58 when the data are read into the secure LSI device 1. A data inherent key used in this decryption process is created from an inherent ID and random numbers, and therefore, the data inherent key is not only different among the respective secure LSI devices 1 but also different at every boot-up operation. Thus, the data are unlikely to be fraudulently used, and the security is improved. Moreover, a program for reproducing contents is also encrypted with the inherent key and therefore is unlikely to be tampered.

Figure 10:
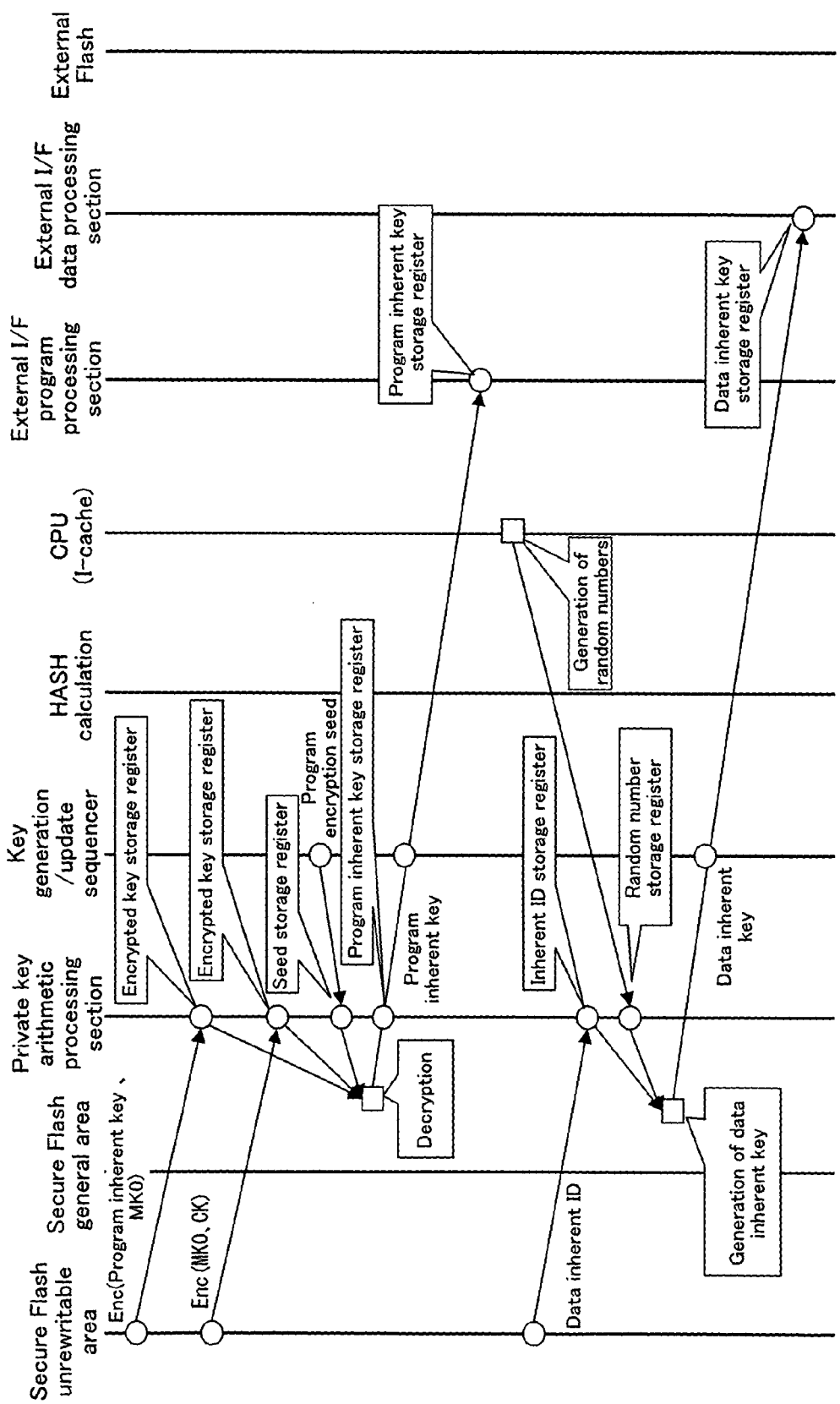
FIG. 10 shows the first part of a dataflow of a normal boot process in the product operation mode.
Figure 11:
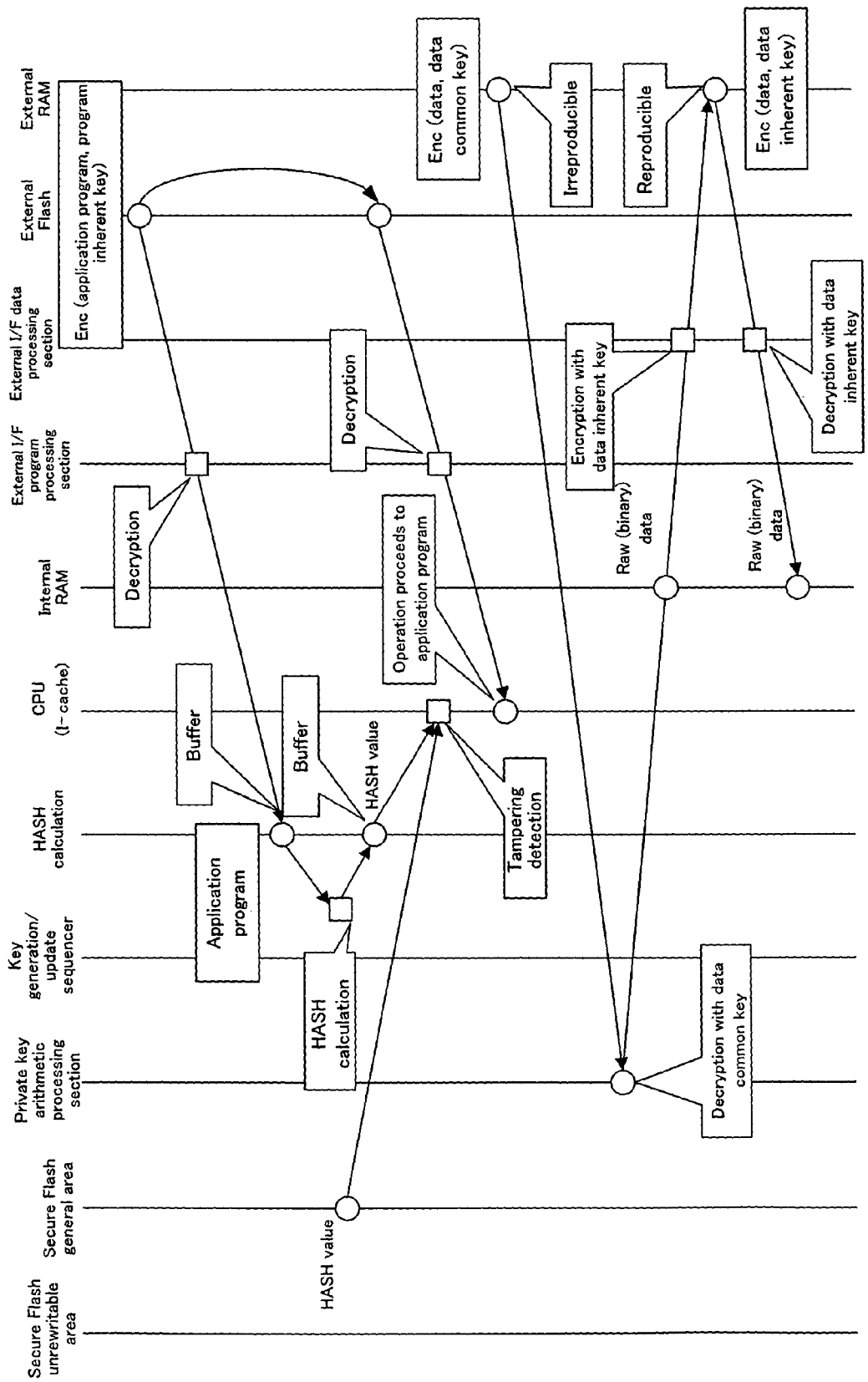
FIG. 11 shows the second part of the dataflow of the normal boot process in the product operation mode.

FIGS. 10 and 11 illustrate a dataflow of the normal boot process in the product operation mode. In FIG. 10, an encrypted program inherent key Enc (program inherent key, MK0), Enc (MK0, CK), which has been stored in the unrewritable area 11 of the secure memory 10, is set in the encryption key storage register of the private key arithmetic processing section 20. Then, the encrypted program inherent key is decrypted using an installed program encryption seed, thereby obtaining a program inherent key. The obtained program inherent key is set in the program inherent key storage register of the program-decryption cryptography engine 53 of the external I/F 50. Thereafter, the data inherent ID stored in the unrewritable area 11 of the secure memory 10 is set in the inherent ID storage register of the private key arithmetic processing section 20. Further, random numbers are generated by the CPU 65, and the generated random numbers are set in the random number storage register of the private key arithmetic processing section 20. Then, the data inherent key is generated from the data inherent ID and the random numbers by the private key arithmetic processing section 20. The generated data inherent key is set in the data inherent key storage register of the data-encryption/decryption cryptography engine 58 of the external I/F 50.

Thereafter, in FIG. 11, an application program Enc (application program, program inherent key), which has been encrypted with the program inherent key and stored in the external memory 100, is decrypted through the program-decryption cryptography engine 53 of the external I/F 50. The decrypted application program is transferred to the HASH calculation section 70 to calculate the HASH value. The calculated HASH value is compared with the HASH value stored in the general area 13 of the secure memory 10 to check whether or not the application program has been tampered. If the HASH values are equal to each other, the process proceeds to the application program Enc (application program, program inherent key) stored in the external memory 100 to execute the application. If the HASH values are not equal to each other, it is determined that some fraud has been committed, and a fraudulent access control procedure is executed.

The application program is executed by the CPU 65. That is, the CPU 65 inside the secure LSI device 1 performs the access control as a master. Thus, the external access address determination section 83 is not involved in the subsequent processes, which are internal access processes. A content (original content) encrypted with the data common key is read from the fourth area (irreproducible area) of the external RAM 102 into the secure LSI device 1 by the application program. The content read into the secure LSI device 1 is decrypted in the private key arithmetic processing section 20 using the data common key written in the secure memory 10. Thereafter, the content is encrypted with the data inherent key through the data-encryption/decryption cryptography engine 58 in the data processing section 55 of the external I/F 50. The encrypted content is written in the third area (reproducible area) of the external RAM 102. After being written in the third area, the content encrypted with the data inherent key is reproducible. In the case of reproducing the content, the content is decrypted with the data inherent key through the data-encryption/decryption cryptography engine 58 which is provided in the data processing section 55 of the external I/F 50.

As described above, according to the present invention, only a sequence determined by the encryption control section that execution of the sequence is permitted is executed by the encryption arithmetic processing section. Thus, fraudulent execution of the sequence can be prevented. Furthermore, in the external interface, the program processing section and the data processing section are structured independently from each other. Thus, the risk of fraudulently executing a program is distributed. Further still, since a content encrypted using the data inherent key generated from the inherent ID is stored in the reproducible area of the external memory, the content cannot be reproduced by a different LSI device which does not have the same data inherent key. Therefore, fraudulent execution of the content is prevented. Thus, the security level is improved.

What is claimed is:

1. A semiconductor device comprising an encryption section which performs at least one of encryption and decryption of a program,
wherein the encryption section includes
an encryption arithmetic processing section capable of executing a plurality of sequences including an encryption process or decryption process of a program, and
an encryption control section for determining whether to permit execution of each of the sequences which can be executed by the encryption arithmetic processing section, and prohibiting the operation of the encryption arithmetic processing section with respect to a sequence whose execution is determined to be impermissible,
wherein the encryption control section includes a mode ID storage register for storing a mode ID; and
the encryption control section determines whether to permit execution of each of the sequences based on the value of the mode ID stored in the mode ID storage register.

2. The semiconductor device according to claim 1, wherein:
the encryption control section includes a plurality of registers which correspond to the sequences on a one-to-one basis, each register storing the number of issuances of a corresponding one of the sequences; and
the encryption control section determines whether to permit execution of each sequence while considering the number of issuances of the each sequence which is stored in the corresponding register in addition to the value of the mode ID.

3. The semiconductor device according to claim 1, further comprising a secure memory having an unrewritable area, the unrewritable area storing the mode ID, wherein
the mode ID storage register is writable only at the time of boot-up of the semiconductor device; and
at the time of boot-up of the semiconductor device, the mode ID read from the unrewritable area of the secure memory is written in the mode ID storage register.

4. The semiconductor device according to claim 3, further comprising a boot ROM for storing a boot program, wherein
writing of the mode ID in the mode ID storage register is performed by the boot program stored in the boot ROM.

5. The semiconductor device according to claim 1, further comprising a secure memory for storing an installation mode flag, the installation mode flag indicating whether or not the semiconductor device is booted up for the first time, wherein
the encryption control section determines whether to permit execution of each sequence while referring to the installation mode flag in addition to the value of the mode ID.

6. A semiconductor device comprising an encryption section which performs at least one of encryption and decryption of a program,
wherein the encryption section includes
an encryption arithmetic processing section capable of executing a plurality of sequences including an encryption process or decryption process of a program, and
an encryption control section for determining whether to permit execution of each of the sequences which can be executed by the encryption arithmetic processing section, and prohibiting the operation of the encryption arithmetic processing section with respect to a sequence whose execution is determined to be impermissible,
the semiconductor device further comprising a boot ROM for storing at least one boot program corresponding to one of the plurality of sequences, wherein
the encryption arithmetic processing section executes the boot program stored in the boot ROM, thereby executing the sequence corresponding to the boot program.

7. A semiconductor device comprising an external interface for inputting/outputting a program or data from/to an external memory, the external interface includes
a program processing section for inputting/outputting a program, and
a data processing section for inputting/outputting data,
wherein the program processing section and the data processing section are structured independently from each other,
wherein the program processing section includes
a through section for inputting/outputting a program as it is, and
a program-decryption cryptography engine for receiving an encrypted program from the external memory, decrypting the encrypted program into a raw (binary) program, and supplying the raw (binary) program to the inside of the semiconductor device.

8. The semiconductor device according to claim 7, wherein:
the through section includes an execution through section and an encryption through section, and
a program input through the encryption through section is executed in the semiconductor device, and a program input through the encryption through section is supplied to and encrypted in an encryption section.

9. The semiconductor device according to claim 8, further comprising an address segment storage register for storing address management information which represents the correspondence between respective areas of the external memory and addresses, wherein
when the semiconductor device accesses the external memory to read a program, the address management information is referred to for determining which of the encryption through section, the execution through section and the program-decryption cryptography engine is activated.

10. The semiconductor device according to claim 9, wherein the address segment storage register is writable only at the time of boot-up of the semiconductor device.

11. The semiconductor device according to claim 10, further comprising a secure memory having an unrewritable area, the unrewritable area storing the address management information, wherein
at the time of boot-up of the semiconductor device, the address management information read from the unrewritable area of the secure memory is written in the address segment storage register.

12. The semiconductor device according to claim 9, further comprising a mode sequencer which has a mode ID storage register for storing a mode ID,
wherein the value of the mode ID stored in the mode ID storage register is additionally considered for determining which of the encryption through section, the execution through section and the program-decryption cryptography engine is activated.

13. The semiconductor device according to claim 12, wherein:
the mode sequencer includes a jumper value determination section; and
a jumper value determined by the jumper value determination section is additionally considered for determining which of the encryption through section, the execution through section and the program-decryption cryptography engine is activated.

14. A content reproduction method, comprising the steps of:
reading an original content stored in an irreproducible area of an external memory into an LSI device;
generating a data inherent key in the LSI device using an inherent ID stored in an internal memory;
encrypting the original content in the LSI device using the data inherent key;
storing the encrypted content in a reproducible area of the external memory;
reading the encrypted content stored in the reproducible area into the LSI device;
decrypting the encrypted content in the LSI device using the data inherent key; and
reproducing the decrypted content in the LSI device.

15. The content reproduction method according to claim 14, wherein:
the original content stored in the irreproducible area is a content encrypted with a data common key;
prior to encryption with the data inherent key, the original content is decrypted using the data common key stored in the internal memory.

* * * * *